No. 778,591. PATENTED DEC. 27, 1904.
M. E. LAYNE.
VALVE.
APPLICATION FILED FEB. 3, 1902.
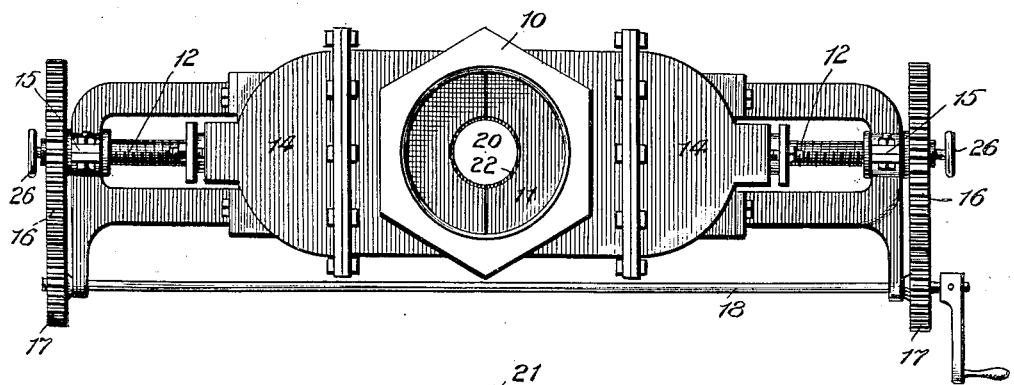
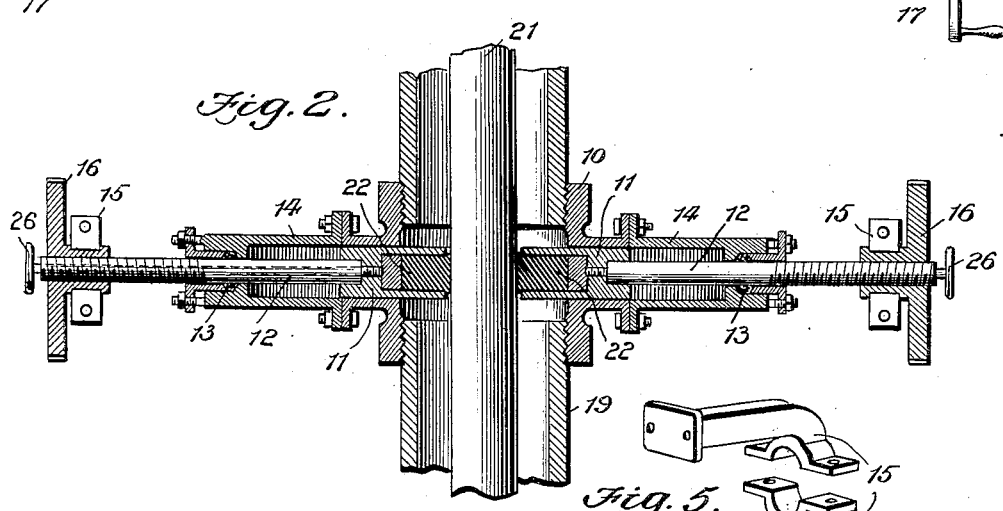
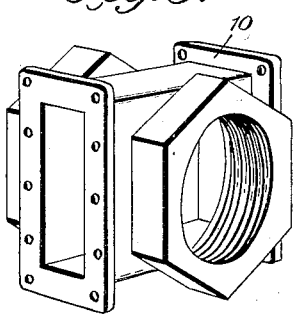
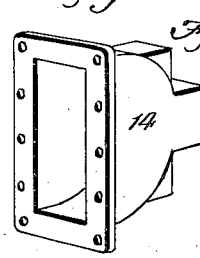
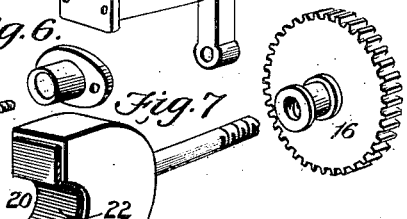
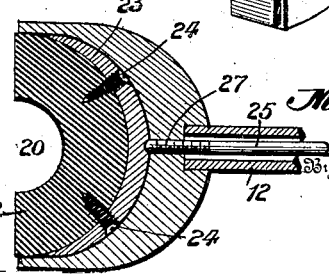
Inventor
Mahlon E. Layne
Witnesses
M. D. Blondel
Philip J. Finnegan
By
Paul Synnestvedt
Attorney No. 778,591.

Patented December 27, 1904.

UNITED STATES PATENT OFFICE.

MAHLON E. LAYNE, OF ROCK RAPIDS, IOWA.

VALVE.

SPECIFICATION forming part of Letters Patent No. 778,591, dated December 27, 1904.

Application filed February 3, 1902. Serial No. 92,381.

*To all whom it may concern:*

Be it known that I, MAHLON E. LAYNE, a citizen of the United States of America, and a resident of Rock Rapids, in the county of Lyon and State of Iowa, have invented certain new and useful Improvements in Valves, (Case No. 1,) of which the following, taken in connection with the accompanying drawings, is a specification.

This invention has reference to the provision of certain improved valve mechanisms, having for its object the construction of means whereby a tubular opening or passage-way, within which there is a rod, as for example, a pump rod in the suction pipe of a pump, can be closed to the passage of fluid pressure, without the removal of the rod.

Another object of the invention is to provide an arrangement of the kind specified, in which the rod can be moved longitudinally relative to its inclosing tube, without, at the same time, permitting the escape or passage of fluid pressure.

Another object of the invention is the provision of what is known as a straightway or gate valve, having oppositely disposed disks, in combination with novel mechanism for operating the same.

Another object of the present invention is the provision of a gate valve having a recess therein, adapted to engage a rod or pipe, when the valve is in closed position.

Still another object of the invention is the provision of a gate valve having a disk provided with soft packing therein.

Still another object of the invention is the provision of a gate valve having a soft packing in a disk, and suitable means for compressing said packing, in order to make a tight joint with the same.

The above, as well as such other objects as may hereinafter appear, I attain by means of a construction which I have illustrated in preferred form in the accompanying drawing, in which Figure 1 is a plan view of a valve and its mechanism embodying my improvements, Figure 2 is a sectional view through the center of the device shown in Figure 1, Figure 3 is a view in perspective of the main valve body, Figure 4 is a view in perspective showing the bonnet used at each end of the valve body, Figure 5 is a view in perspective of the part which constitutes the supporting bracket that carries the outer end of the valve operating spindle, Figure 6 is a detail view showing the stuffing box gland, Figure 7 is a perspective view of the gate valve disk with the soft packing therein, Figure 8 is a view in perspective of one of the gears arranged at the end of the valve spindle, and Figure 9 is a sectional view showing the construction of gate valve disk and soft packing with the means employed therein for compressing the packing to make a tight joint.

Referring now more particularly to Figures 1 and 2 it will be seen that in carrying out my invention I provide first a valve body 10, containing two disks 11, arranged one at each side of the valve body, that is, oppositely disposed, and constructed to be operated by valve spindles 12, which pass through the stuffing boxes 13 of the bonnet 14, and at their outer ends are arranged to be supported by the bracket 15, and to be actuated by the gears 16, which receive their motion through the gears 17 mounted on the hand operated shaft 18, as clearly shown in the drawing.

The valve body 10 is constructed with threaded openings adapted for attachment to tubes or pipes 19, such for example as the suction pipe used in well work, and the disks 11 are provided with recesses 20, adapted to surround a central rod 21, which may be for example the rod which operates the pump cylinder at the bottom of the tube 19.

The valve disks 11 are provided with soft packing 22, which is also recessed to surround the rod 21, and back of which there is a packing compressor 23, or follower, to which the soft packing is secured by screws 24, and which is arranged to reciprocate, receiving movement through the rod 25, which is within the valve-stem 12, the latter being tubular.

By the extension of the rod 25 through the tubular stem 12, and the employment of the hand-wheel 26 on said inner rod, the rod 25 being threaded as shown at 27, can be caused to push the packing follower 23 inward and compress the soft packing so as to make a tight joint when the valve disks are in closed position around the rod 21.

From the above description it is obvious that my improved valve mechanism is capable of a large number of different uses, and is in fact applicable in any place where it is desired to control the passage through a tube, while leaving in the tube a rod or another tube, or while it is desired to control the opening from one tube, while there is at the same time another tube to be moved in position or slid longitudinally relatively to the outer tube, thus in the drawing shown, assuming the outer tube 19 to be as suggested, a well tube, and the inner rod 21 the operating rod for a pump cylinder, it is obvious that with the valve placed as shown in Figure 2, the opening or passage of the tube 19 can be closed, tight around the rod 21, and at the same time the rod 21 can be moved or pulled longitudinally relative to the tube 19, to bring it to any position which may be necessary to do such work on the apparatus as would be required. It could also be used to insert new sections of tube one within another, as is sometimes necessary in well constructions.

The hand operative shaft or rod 18 is provided as a means for imparting movement to the gears 17, through which, and the gears 16 which connect therewith, simultaneous movement is obtained of the two oppositely disposed disks 11.

Having thus described my invention, what I claim as new, and desire to secure by Letters Patent, is—

1. A gate valve comprising oppositely disposed gate members adapted to reciprocate into engagement with each other to close, and from each other to open, said valve, and means for reciprocating said members, substantially as described.

2. A gate valve comprising two gates situated on opposite sides of a fluid passage or opening, between them and connected means for reciprocating them to and from each other moving them simultaneously to close said opening.

3. A gate valve have oppositely disposed hollow gate members provided with corresponding transverse recesses to surround an object between them, a packing in each of said members, and connected mechanism for simultaneously reciprocating said members to and from each other.

4. A valve for closing the space between two concentric pipes, comprising a recessed hollow gate moving edgewise in the larger pipe to constrict the opening and engage the inner pipe, and a soft packing within said recessed gate having means independent of the gate moving means, for compressing the packing against the inner pipe, substantially as described.

5. A valve having a hollow gate moving sidewise to constrict the valve opening, soft packing in the chamber of said disk, means for compressing said packing in the direction of movement of the gate, and a recess in said gate and packing transverse to the plane of the gate.

In testimony whereof I have hereunto set my hand in the presence of two subscribing witnesses.

M. E. LAYNE.

Witnesses:
PAUL SYNNESTVEDT,
PAUL CARPENTER.